Figure 1:
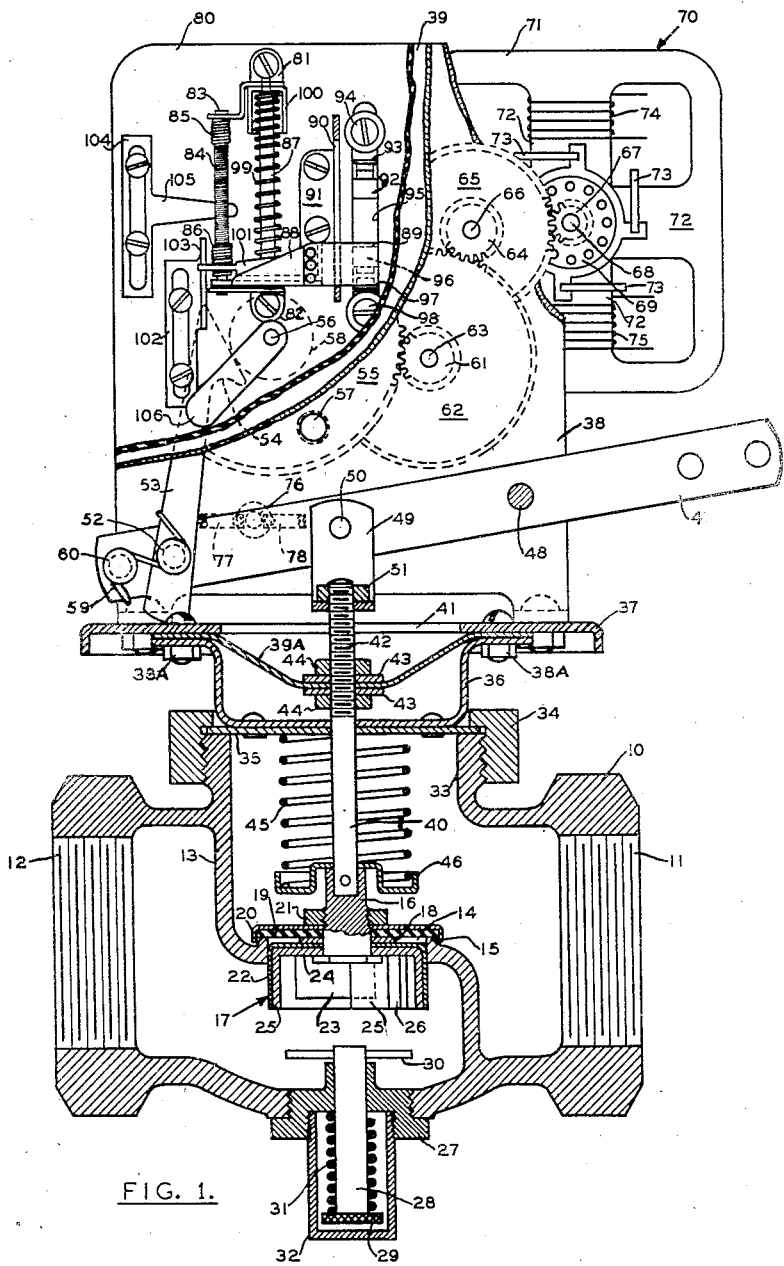

Feb. 4, 1936.  L. L. CUNNINGHAM  2,029,465
MODULATING ELECTRIC VALVE
Filed Nov. 11, 1933   2 Sheets-Sheet 1

Inventor
LEWIS L. CUNNINGHAM

By George H. Fisher
Attorney

Feb. 4, 1936.   L. L. CUNNINGHAM   2,029,465
MODULATING ELECTRIC VALVE
Filed Nov. 11, 1933   2 Sheets-Sheet 2

Inventor
LEWIS L. CUNNINGHAM

By George H. Fisher
Attorney

Patented Feb. 4, 1936

2,029,465

UNITED STATES PATENT OFFICE 2,029,465

MODULATING ELECTRIC VALVE

Lewis L. Cunningham, Minneapolis, Minn., assignor to Minneapolis-Honeywell Regulator Company, Minneapolis, Minn., a corporation of Delaware Application November 11, 1933, Serial No. 697,686

29 Claims. (Cl. 236—74)

The present invention relates to the positioning of an element or a mechanism in accordance with the changes in a condition or the movements of a movable member and is specifically directed to the control of a valve by which the flow of fuel, such as gas, to a burner is controlled.

One of the objects of the invention is the provision of a fully electrical system of control of simple arrangement which does not require complicated mechanical latching or other similar mechanisms.

Another object of the invention is the provision of an electrical control system for an element to be controlled by which the element is initially given a rapid quick movement to a predetermined position and is thereafter slowly moved as the result of movements of a movable member or the changes in a condition. More specifically, the motive means for the element to be controlled is operatively deenergized until conditions are such as to require a substantial movement of the element at which time the motive means is energized in such manner as to supply the necessary movement to the element. The element is thereafter maintained in its new position by energizing the motive means to a different extent but without the aid of mechanical latching mechanisms.

A further object of the invention is the provision of a control device in which an element to be controlled is normally biased to one of its extreme positions, is moved against its bias to another of its positions by completely energizing a rotary electrical motor and is thereafter maintained in its new position by only partially energizing the motor.

Another object of the invention is the provision of an electrical control system for a valve whereby the valve is given a quick initial movement from closed position to an appreciable open position and is thereafter modulated in accordance with demands until the valve approaches nearly closed position whereupon it is quickly moved to closed position.

A further object of the invention is the provision of a variable flow controlling mechanism which remains in its flow obstructing position until there is a demand for an appreciable flow whereupon the mechanism is operated initially to establish a flow which is considerably larger than the demand and is automatically returned to a position permitting the desired flow, after which the flow is modulated in accordance with demands. When the flow demand decreases to a predetermined minimum, the mechanism of the present invention thereupon ceases modulating the flow and again moves the flow controlling mechanism to flow obstructing position.

Another object of the invention is the provision of an electrically controlled valve which, upon an initial relatively small demand, opens widely and then returns to a position corresponding to the demand and thereafter modulates in accordance with the demands.

Other objects of the invention will be found in the following detailed description and accompanying drawings and the appended claims.

Figure 2:
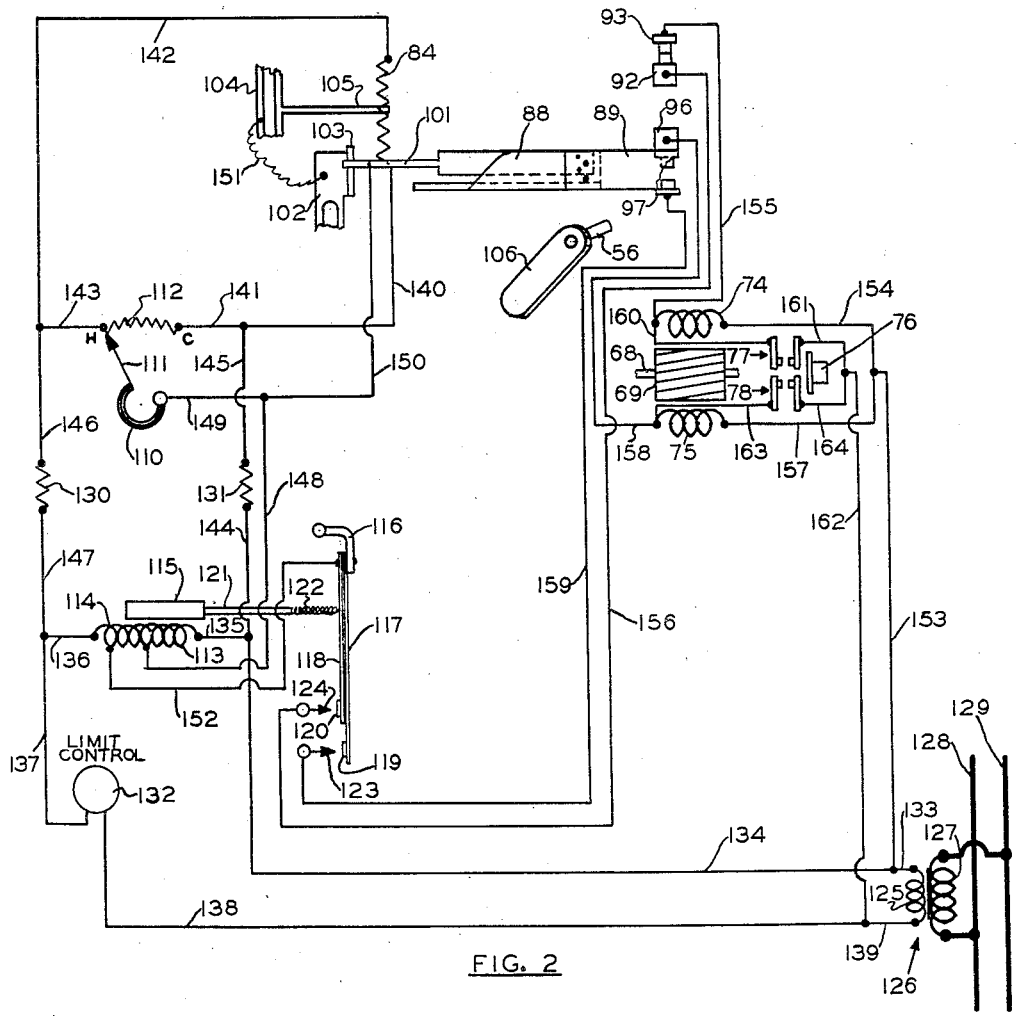
Figure 3:
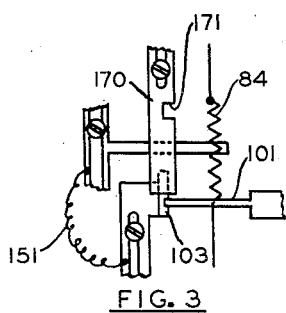

In the drawings,

Fig. 1 is a side view of a valve mechanism built in accordance with the present invention, certain parts being in section and others being broken away to show the details of construction more clearly, Fig. 2 is a diagrammatic showing of the control system by means of which the valve is controlled, and Fig. 3 is a partial view showing a modified form of the invention.

Referring first to Fig. 1 of the drawings, the invention is herein shown as applied to a gas valve comprising a casing 10 having outlet and inlet openings 11 and 12 respectively formed therein and a partition wall 13 which divides the valve casing 10 into inlet and outlet chambers. The partition 13 is provided with a valve opening 14 which forms a valve seat 15. An inverted screw 16, having an enlarged head, receives an adjustable flow throttling assembly 17, a washer 18, a valve disc 19, and a valve disc retainer 20, in the order named. A nut 21 clamps these parts against the head of screw 16 so that the screw 16, throttling assembly 17, washer 18, disc 19 and disc retainer 20 form a unitary assembly. The valve disc 20 cooperates with valve seat 15 to prevent or permit the flow of fluid through the valve.

The throttling assembly 17 comprises a cylindrical member 22 which is provided with openings 23 and a disc 24 which is provided with downwardly extending skirts 25. Each skirt 25 is provided with an inwardly extending radial projection 26. The lower portion of valve casing 10 is provided with a threaded opening which receives a bonnet 27 through which passes a pin 28 having an operating head 29. That end of pin 28 which terminates within valve casing 10 receives cross bar 30. A coiled spring 31, which is confined between bonnet 27 and operating head 29, biases pin 28 and cross bar 30 to the position shown in Fig. 1. A cap 32 which is threaded into bonnet 27 and encloses pin 28 and coiled spring 31 prevents the passage of gas from inside the casing 10, through the opening in bonnet 27 through which pin 28 passes, and to the atmosphere.

The skirts 25 are adapted to cover more or less of the openings 23 in order to increase or decrease the width of these openings whereby upon upward movement of screw 16 to unseat valve disc 19, a variable amount of gas can pass through these openings 23. When it is desired to move skirts 25 so as to cover more or less of openings 23, cap 32 is removed and pin 28 is thrust upwardly within the throttling assembly 17 so that upon rotation of pin 28 the cross bar 30 engages projections 26 and rotates skirts 25 within the cylindrical member 22. In this manner, the maximum flow of gas through openings 23 on upward movement of screw 16 may be adjusted.

The valve casing 10 is also provided with a vertical cylindrical extension 33 which is provided with exterior screw threads which receive a nut 34 that clamps a disc 35 against the end of extension 33. Riveted to disc 35 is a cup-shaped member 36 which is secured to a circular base plate 37 by means of suitable screws and nuts 38A, there being a sealing-off diaphragm 39A clamped between cup-shaped member 36 and base plate 37. Base plate 37 supports a pair of vertical extending frame plates 38 and 39.

A valve stem 40 is loosely received within and pivoted to the upper end of screw 16 and extends upwardly through disc 35, cup-shaped member 36, diaphragm 39A, and an opening 41 in base plate 37 and terminates above base plate 37 and between frame plates 38 and 39. The upper end of valve stem 40 is threaded as indicated at 42. Clamping members 43 are placed on each side of diaphragm 39A and clamped there-against by means of nuts 44 which cooperate with the threaded portion 42 of valve stem 40. In this manner, valve stem 40 is free to move vertically but the sealing-off diaphragm 39A prevents the escape of gas from cup member 36 to the atmosphere. A coiled spring 45 is confined between disc 35 and a spring retainer 46 which rests upon the upper end of screw 16 whereby the coiled spring 45 acts to bias the valve disc 19 and throttling assembly 17 to the position shown in the drawings wherein no gas is permitted to flow through the valve casing 10.

A lever 47 is located between frame plates 38 and 39 and is pivoted upon a pin 48 which is supported in these base plates. A U-shaped bracket 49 is pivoted to lever 47 as indicated at 50. Valve stem 40 extends within U-shaped bracket 49 and is provided with a nut 51 whereby upward movement of U-shaped bracket 49 serves to lift valve stem 40. A pin 52 is secured to lever 47 near the left hand end thereof and pivotally supports an upwardly extending link 53 which is provided with a hook 54. A large gear 55 is secured to a shaft 56 which is journalled in frame plates 38 and 39. Gear 55 is provided with a crank pin 57 which is adapted, upon clockwise rotation of gear 55, to engage the hook 54 of link 53 and raise the link 53. Such upward movement of link 53 rotates lever 47 in a clockwise direction about pin 48 whereby valve stem 40 is elevated. The upper end of link 53 is biased into engagement with the hub 58 of a gear 55 by means of a spring 59 which engages the left side of link 53, passes around pin 52 and a second pin 60 secured to lever 47, and is then hooked over the left hand end of lever 47. In this manner, the link 53 is always held in the position wherein its hook 54 is ready to receive crank pin 57.

Gear 55 meshes with a pinion 61 which is formed integral with a gear 62. Gear 62 and pinion 61 are journalled on a shaft 63 mounted in frame plates 38 and 39. Gear 62 in turn meshes with a pinion 64 which is formed integral with a gear 65 journalled on a shaft 66 that is likewise mounted in frame plates 38 and 39. All of these gears and pinions are located between frame plates 38 and 39. Gear 65 meshes with a rotor pinion 67 which is secured upon a rotor shaft 68 that extends rearwardly through frame plate 38. Rotor shaft 68 carries the rotor 69 of an induction motor 70 which is located in back of frame plate 38. It will be understood that the motor 70 in actual construction is located directly in back of plate 38 and that it has been shown as extending beyond plate 38 merely for clarity of illustration. The induction motor 70 is provided with a field core 71 having four poles 72 all of which are split into two portions and one of these portions of each of the field poles is provided with the usual copper shading ring 73. One of poles 72 is provided with a field winding 74 and the oppositely disposed pole 72 is provided with a similar field winding 75, there being no field windings on the other two poles in this particular type of motor.

On energization of field windings 74 and 75, rotor 69 is rotated in a clockwise direction and slowly drives gear 55 in a clockwise direction through the above described speed reducing and torque multiplying gear train. The initial clockwise rotation of gear 55 serves to take up the lost motion between crank pin 57 and hook 54. Further clockwise rotation of gear 55 serves to lift hook 54 by means of crank pin 57 whereby valve stem 40 is elevated. Upon deenergization of both field windings 74 and 75, the coiled spring 45 returns the valve disc 19 into engagement with valve seat 15 and the various gears and pinions and motor rotor are rotated in the reverse directions. When the valve has completely seated the gears and motor rotor may continue rotating until all of their energy is expended and they will thereupon substantially assume the position shown in Fig. 1 of the drawings.

The apparatus is provided with the usual manually operable pin 76 by which the lever 47 may be manually latched in such position as to maintain the valve in a partial open position. Such operation of pin 76 closes recycling switches 77 and 78 in the usual manner.

A panel 80 of insulating material is supported by frame plate 39 forwardly thereof and spaced therefrom. A pair of brackets 81 and 82 which are secured to panel 80 supports a vertical core 83 about which is wound a coil of resistance wire 84. The ends of resistance wire 84 are respectively secured to wires 85 and 86 of relatively low resistance, resistance 84 and wires 85 and 86 being insulated from core 83 in any suitable manner. The brackets 81 and 82 also support a guide pin 87. An actuating assembly comprises a slider 88, which is adapted to slide up and down upon guide pin 87, and a strip of insulating material 89 which is received in a vertical slot 90 formed in a bracket 91 which is carried by panel 80. A limit switch assembly comprises a contact post 92 and a flexible contact arm 93 which are adjustably secured on the rear surface of panel 80 by means of a screw 94 and extend through a slot 95 formed in insulating panel 80. The contact post 92 and flexible contact arm 93 are normally in engagement but upon extreme upward movement of slider 88, strip 89 passes over contact post 92 and engages flexible contact arm 93 to raise the same out of engagement with contact post 92. A similar limit switch assembly comprises a contact post 96 and a flexible contact arm 97 which are adjustably secured to the rear face of insulating panel 80 by means of a screw 98. Contact post 96 and flexible contact arm 97 also extend forwardly through slot 95 and are normally in engagement. However, with the slider 88 in its lowermost position as shown in the drawings, strip 89 has passed over contact post 96 and engaged flexible contact arm 97 to move the same downwardly out of engagement with contact post 96. Slider 88 is normally biased to its lowermost position by means of a coiled spring 99 which surrounds guide pin 87 and a cap 100, which is mounted on guide pin 87, limits the upward movement of slider 88. The slider 88 supports a flexible contact finger 101 which is adapted to engage the resistance 84 upon upward movement of slider 88. However, a bracket 102 which is adjustably secured to panel 80 is provided with a cam surface 103 upon which flexible finger 101 is adapted to ride during upward movement of slider 88 whereby the flexible contact finger 101 is raised from engagement with resistance 84 during part of the travel of slider 88. An adjustable bracket 104 is provided with an extension in the form of a contact finger 105 which engages the rear surface of resistance 84 and may be adjusted therealong. The shaft 56 extends forwardly through panel 80 and carries an actuator 106 of insulating material.

Upon clockwise rotation of gear 55 actuator 106 approaches the extended end of slider 88 and crank pin 57 approaches hook 54. Actuator 106 engages and raises slider 88 upwardly a short distance sufficient to allow flexible contact arm 97 to engage contact post 96 just prior to the time that crank pin 57 engages hook 54 to place the load of opening the valve against the action of coiled spring 45 upon the motor 70. During continued clockwise rotation of gear 55, the valve will be gradually opened as heretofore explained and simultaneously the actuator 106 will continue to move slider 88 upwardly so that contact finger 101 will ride off of cam surface 103 and engage resistance 84. When the valve has been completely opened, strip 89 will engage flexible contact arm 93 to move the same from engagement with contact post 92.

Turning now to Fig. 2, a main control is herein illustrated in the form of a potentiometer room thermostat comprising a bimetallic actuating element 110 which controls a movable contact member 111 that is adapted to sweep across a resistance 112 upon changes in the temperature to which bimetallic element 110 responds. The system further includes a pair of solenoid coils 113 and 114 which are connected in series and conjointly control the movements of a plunger 115. A switch assembly comprises a pivoted bracket 116 to which is secured a pair of flexible contact carrying arms 117 and 118 that support contacts 119 and 120. Plunger 115 is connected to flexible arm 118 through connecting means including a shaft 121 and a light coiled spring 122. On initial movement of plunger 115 to the left, contact 119 is first moved into engagement with a relatively stationary contact 123 and upon continued movement of plunger 115 to the left, contact 120 is brought into engagement with a contact 124. Low voltage electrical power is supplied by the low voltage secondary 125 of a step down transformer 126 having a high voltage primary 127 connected to line wires 128 and 129. The system also includes a pair of protective resistances 130 and 131 and preferably includes a limit control 132. Solenoid windings 113 and 114 are connected in series across the secondary 125 and through limit control 132 by means of wires 133, 134, 135, 136, 137, 138 and 139.

Resistance 84 is connected in parallel with resistance 112 by wires 140, 141, 142 and 143 and these two resistances are likewise connected in parallel with solenoid windings 113 and 114, in series, through protective resistances 130 and 131 by wires 144, 145, 146 and 147. The junction of solenoid windings 113 and 114, movable contact member 111, and contact finger 101 are interconnected by wires 148, 149 and 150. Cam surface 103 of bracket 102 is connected to adjustable finger 105 of bracket 104 by a wire 151. A small number of turns of solenoid 114 is connected to blades 117 and 118 by a wire 152. The remaining circuit connections will be pointed out in detail during the description of the operation of the system.

*Operation*

With the parts in the position shown, the temperature to which thermostat 110 responds is at or above the desired point as indicated by movable contact member 111 being in engagement with the extreme left hand end of resistance 112. The valve is completely closed and contact finger 101 is out of engagement with resistance 84 and riding on cam surface 103. Finger 105 has been adjusted so that it engages substantially the mid-portion of resistance 84. It will be noted that solenoid coil 114 is substantially short-circuited by wire 136, wire 147, protective resistance 130, wire 146, wire 143, movable contact member 111, thermostatic element 110, wire 149 and wire 148. If it were not for the protective resistance 130 the solenoid coil 114 would be completely short-circuited. The same would likewise be true of solenoid coil 113 if contact finger 101 were in engagement with the lower end of resistance 84. However, contact finger 101 is engaged with the center portion of resistances 84 through cam surface 103 of bracket 102, wire 151 and contact finger 105 of bracket 104. The current flow through solenoid coil 113 is therefore considerably larger than the current flow through solenoid coil 114 and the plunger 115 is in the extreme right hand position shown in the drawings wherein contacts 119 and 120 are both disengaged from their cooperating contacts 123 and 124. Field windings 74 and 75 are therefore both deenergized, flexible contact arm 93 is engaged with contact post 92 and flexible contact arm 97 is disengaged from contact post 96.

Now if the temperature to which thermostatic element 110 responds slowly begins to fall, movable contact member 111 will begin traveling along resistance 112 toward the right hand end thereof and when movable contact member 111 is contacting substantially the center portion of resistance 112 the current flow through solenoids 113 and 114 will become equalized. Plunger 115 therefore moves to its center position and contacts 119 and 120 are thereupon brought into engagement with contacts 123 and 124, contact 119 first engaging contact 123 and contact 120 thereafter engaging contact 124. Engagement of contact 120 with contact 124 establishes an energizing circuit for field winding 74 as follows: secondary 125, wire 133, wire 153, wire 154, field winding 74, wire 155, flexible contact arm 93, contact post 92, wire 156, contact 124, contact 120, flexible arm 118, wire 152, a small number of turns of solenoid 114, wire 136, wire 137, limit control 132, and wires 138 and 139 to the other side of secondary 125. Energization of this angle field winding 74 supplies enough power to rotor 69 to rotate gear 55 to begin to take up the lost motion between crank pin 57 and hook 54, it being noted that there is no appreciable load on the motor 70 while this lost motion is being taken up. It will be noted that this circuit traverses a small number of turns of solenoid winding 114 and this increased current flow through solenoid winding 114 brings plunger 115 to the left with slightly increased force so as to bring contacts 120 and 119 firmly into engagement with contacts 124 and 123. Slightly before crank pin 57 engages hook 54, actuator 106 engages slider 88 lifting it a small amount so that strip 89 moves away from flexible contact arm 97 and allows the latter to move into engagement with contact post 96. An energizing circuit for field winding 75 is thereupon established as follows: secondary 125, wire 133, wire 153, wire 157, field winding 75, wire 158, contact post 96, flexible contact arm 97, wire 159, contact 123, contact 119, flexible blade 117, wire 152, a small number of turns of solenoid coil 114, wire 136, wire 137, limit control 132, wire 138 and wire 139 to secondary 125. This increased current flow to solenoid winding 114 also helps to maintain contacts 119 and 120 in firm engagement with contacts 123 and 124. The added power supplied to rotor 69 by energization of field winding 75 enables motor 70 to lift the valve from its seat against the bias of spring 46 upon engagement of crank pin 57 with hook 54. As the valve opens, slider 88 continues to move upwardly until contact finger 101 rides off cam surface 103 and moves into engagement with resistance 84. The valve will continue to open and slider 88 will continue to move upwardly until such time as contact finger 101 engages resistance 84 at a point slightly above that which time the current flows through solenoid coils 113 and 114 will be so related that plunger 115 will move slightly to the right to disengage contact 120 from contact 124. When this happens, field winding 74 is deenergized. The valve now remains in the position to which it has been moved by the cooperation of field windings 74 and 75 since the power supplied by field winding 75 taken together with the friction throughout the mechanism is sufficient to maintain the valve in such position but is insufficient to continue opening the valve.

It will therefore be seen that with the valve in an initially closed position, the demand for heat must increase to such a point as to require a substantial valve opening before the valve will start to open. The minimum valve opening from a closed position, as will be seen from the foregoing description, is dependent upon the position of manually adjustable contact finger 105 along resistance 84.

If the temperature should continue to fall so that movable contact member 111 moves further along resistance 112 toward the right hand end thereof, the current flows through solenoid windings 113 and 114 will again be changed and plunger 115 will again move to the left to bring contact 120 into engagement with contact 124. Field winding 74 will thereupon be again energized to open the valve more widely and to additionally lift slider 88 which in turn moves contact finger 101 upwardly along resistance 84. When contact finger 101 has reached a point on resistance 84 such that the current flows through solenoid windings 113 and 114 are again so related that plunger 115 moves to the right and separates contact 120 from contact 124, the field winding 74 will again be deenergized and field winding 75 remaining energized will maintain the valve in its new position.

If the temperature should now rise slightly, movable contact member 111 will move along resistance 112 toward the left end thereof and the current flow through solenoid coil 113 will be increased in respect to the current flow through solenoid coil 114. Plunger 115 will therefore move slighty to the right to disengage contact 119 from contact 123. Both the field windings 74 and 75 are now deenergized and the valve will begin to return towards closed position under the bias of spring 45 and at the same time slider 88 will move contact 101 downwardly along resistance 84. Such downward movement of contact 101 will change the current flows through solenoid coils 113 and 114 in such manner that plunger 15 again moves slowly to the left, bringing contact 119 into engagement with contact 123 whereupon field winding 75 is again energized to prevent further closing movement of the valve.

In this manner, after the valve has been initially opened, its position is modulated or proportioned in accordance with the temperature fluctuations to which thermostatic element 110 responds. If the temperature should fall to such a low degree that when the valve is completely opened contacts 119 and 120 are still engaged with contacts 123 and 124, the strip 89 will move into engagement with flexible contact arm 93 to lift the same out of engagement with contact post 92 whereupon field winding 74 is deenergized and the valve is maintained in its full open position by field winding 75. In this manner, the maximum opening of the valve may be determined by adjusting the limit switch 92—93.

As the temperature rises, the valve will close more and more and contact finger 101 will move downwardly along resistance 84 until it passes through the point at which contact finger 105 is in engagement with resistance 84 and until the demand for heat is such that the valve reaches a position wherein contact finger 101 rides upon cam surface 103 and moves out of engagement with resistance 84. At this time, finger 105 is electrically connected in the system again and direct electrical connection between finger 101 and resistance 84 is discontinued. Inasmuch as movable contact member 111 is now contacting resistance 112 at a point further towards the left end thereof than is necessary in order to bring contacts 119 and 120 into engagement with contacts 123 and 124, the current flow through solenoid winding 113 will be increased in respect to the current flow through solenoid coil 114 to such an extent that contacts 119 and 120 will disengage contacts 123 and 124 rendering both field windings 74 and 75 deenergized and the valve will completely close. It will therefore be noted that when the valve approaches a predetermined minimum position after having once been opened, it will quickly and suddenly close. This minimum position during closing movement may be adjusted by moving cam surface 103 up or down.

From the foregoing description, it will be apparent that the present invention provides control mechanism whereby an element or device to be controlled remains in one position until a movable member has moved to a position corresponding to a relatively large movement of the device whereupon the device quickly assumes a position in accordance with the position of movable member. Thereafter, the device continuously moves in accordance with movements of the movable member until the movable member approaches some predetermined position whereupon the arrangement is such that the device quickly moves to its initial position without any further movements of the movable member.

As applied to valves, the invention provides an electrically controlled system whereby the valve actuating mechanism remains deenergized until there is a demand for a substantial valve opening at which time the valve moves quickly to such position. Thereafter, the valve opens more widely and/or moves to more nearly closed position strictly in accordance with demands until a minimum open position is reached at which time the electrical actuating means is deenergized and the valve quickly moves to fully closed position.

It will also be noted that only a single motive means is utilized and that there are no latching mechanisms or other complicated mechanical features for locking the valve in its various positions. All of the functions are obtained by changing the energization of the single motive means.

The invention also provides an arrangement wherein a valve which is continuously biased to one of its flow controlling positions is moved therefrom by the energization of all of the windings of a rotary electrical motor and is maintained in the new position to which it is moved by deenergizing a portion of the field windings but continuing energization of the remaining portion thereof.

If the supply of electrical power should fail at any time and it be desired to open the valve, this may be accomplished by manually depressing the outer end of lever 47 and pressing inwardly on pin 76 so that it extends under lever 47 and prevents its return to valve closed position. Such manipulation of pin 75 closes recycling switches 77 and 78 whereby upon the return of electrical power energizing circuits for both field windings 74 and 75 are immediately established to more widely open the valve thereby allowing pin 76 to return to its original position and returning the valve to automatic control. This recycling circuit for field winding 74 is as follows: secondary 125, wire 133, wire 153, wire 154, field winding 74, wire 160, recycling switch 77, wire 161, wire 162, and wire 139 to the other side of secondary 125. The recycling energizing circuit for field winding 75 is as follows: secondary 125, wire 133, wire 153, wire 157, field winding 75, wire 163, recycling switch 78, wire 164, wire 162, and wire 139 to the other side of secondary 125.

Where the valve of the present invention is utilized to control the flow of fuel to a burner, such as the flow of gas to a gas burner, it is often necessary that a relatively large initial flow be supplied in order to obtain proper ignition and prevent pop-backs in the burner. This can be accomplished by adjusting contact finger 105 upwardly along resistance 84 so that the initial opening of the valve will be sufficiently wide to allow proper ignition. However, some burners require such an initial large opening of the valve that the modulating range of the valve upon a temperature fall is practically eliminated. In other words, with some burners, it is unsafe to open the valve initially except to a substantially completely full open position which means that the temperature or other condition must decrease or change to such an extent that there is a substantially complete demand for heat before the valve may be opened. This allows only a very small further fall in temperature or change in the condition before the valve will be completely opened so that there is only a small range within which the valve may modulate in moving from closed to open position. In order to overcome this difficulty, it is desirable upon an initial call for a relatively small flow of gas initially to open the valve quite widely and then automatically return the valve to a more nearly closed position which corresponds to the demand for heat. This action is very simply accomplished by a small addition to the mechanism heretofore explained.

Referring to Fig. 3, an extra track or cam 170 has been provided. This track or cam of course should be secured to the panel 80 of Fig. 1 and overlies cam surface 103 but engages the same. Now, upon an initial call for heat resulting in movement of finger 101 in an upward direction, this finger will ride from cam surface 103 upon cam surface 170 instead of riding off cam surface 103 and moving into engagement with resistance 84. The current flows through solenoid coils 113 and 114 therefore remain the same and finger 101 continues its upward movement until it reaches a notch 171 formed in cam surface 170 whereupon contact finger 101 moves into engagement with resistance 84. The cam surface 170 may be adjusted so that its notch is opposite a point in resistance 84 corresponding to any desired initial minimum opening of the valve. As shown, the notch 171 is opposite a point near the upper end of resistance 84 so the valve will open almost completely before finger 101 passes through notch 171 and moves into engagement with resistance 84. At this time, the current flows through solenoid coil 113 and 114 will be instantly changed, the current flow through solenoid coil 113 being greatly increased in respect to the current flow through solenoid coil 114. Plunger 115 will therefore move to the right sufficiently to disengage contacts 119 and 120 from contacts 123 and 124 whereby field windings 74 and 75 are both deenergized and the valve begins to close. As the valve moves toward closed position, contact finger 101 will move down resistance 84 until it reaches a position wherein the current flows through solenoid coils 113 and 114 are so proportioned that contact 119 again engages contact 123 to energize field winding 75 which, as heretofore explained, maintains the valve in whatever position it may have been upon such energization of field winding 75. The valve is now free to modulate upwardly through a relatively large range of its movement during temperature fall. When the temperature rises to such a point that contact finger 101 moves downwardly into engagement with cam surface 103, the valve will quickly close as heretofore explained and contact finger 101 will ride under the cam surface 170 to the position shown in Fig. 3.

In this manner, if desired, the apparatus can be so arranged that the valve or other device will initially move through a large portion of its range and automatically move back to a position corresponding to the position of the control member which started the valve or device in operation. Thereafter the valve or device may modulate strictly in accordance with the demands until such time as it approaches its initial position whereupon it quickly moves to its initial position and remains therein until the cycle is repeated.

From the foregoing description, it will be seen that the present invention provides an extremely simple arrangement for controlling a valve or other device in the manners heretofore explained and that such control does not include any complicated mechanical mechanisms. While a valve has been utilized in the description and the drawings for explaining the invention, it is to be understood that the valve could well be replaced by any other device or arrangement which it is desired to move or control in a similar manner. Furthermore, the movable contact member 111 may respond to any temperature whatsoever or may respond to any other desired condition or be moved in any other desired manner. Various modifications and changes can be made in the present invention by those skilled in the art and I therefore am only to be limited in accordance with the scope of the appended claims.

I claim as my invention:

1. Mechanism of the class described, comprising, in combination, a movable member movable along a predetermined path of travel, electrical actuating means, a device controlled thereby, means associated with said electrical actuating means and movable member for controlling the electrical actuating means initially to energize the electrical actuating means to in turn move said device a relatively large amount only upon relatively large travel of said movable member in one direction to a first point, means associated with said electrical control means and movable member for thereafter moving said device back and forth in small increments upon corresponding movement of said movable member, and means associated with said electrical actuating means and movable member for quickly returning said device to its initial position upon travel of said movable member to a second point through which it passed in moving to said first point.

2. In combination, flow controlling mechanism, a member movable back and forth along a path of travel, electrical actuating means for said flow controlling mechanism, means associated with said movable member and electrical actuating means for controlling the electrical actuating means initially to energize the electrical actuating means to in turn supply a relatively large flow only after said movable member reaches a first point upon travel in one direction, means associated with said movable member and electrical actuating means for thereafter increasing and decreasing said flow in small increments corresponding to continued and reverse movements of said movable member, and means associated with said movable member and electrical actuating means for discontinuing flow upon movement of said movable member in the reverse direction to a second point, said movable member moving through said first point to reach said second point.

3. In combination, a single valve biased to closed position, a member movable back and forth along a predetermined path of travel in response to changes in fluid flow demand, a single electric motor means for controlling the movements of said valve, and means associated with said movable member, valve and motor means for normally moving said valve in accordance with the movements of said movable member but operative to maintain said valve closed during movement of said movable member through a predetermined portion of its range of movement, after which said valve is moved a relatively large amount to a position corresponding to the position of the movable member.

4. In combination, a single valve biased to closed position for controlling the supply of fuel to a burner, a member movable back and forth along a predetermined path of travel in response to changes in fuel flow demand, a single electric motor means for controlling the movements of said valve, and control means associated with said movable member and motor means for maintaining said valve closed until the movable member reaches a position corresponding to a demand for a supply of fuel sufficiently large to properly ignite whereupon said valve is quickly moved to such position and for thereafter opening the valve further in a plurality of relatively small increments as the movable member continues movement in the same direction as a result of continued increase in the fuel demand.

5. In combination, a valve biased to closed position for controlling the flow of fuel to a burner, a movable member movable back and forth along a predetermined path of travel in response to changes in fuel flow demand, a single electric motor means for operating said valve, means associated with said motor means and movable member for maintaining said motor means deenergized until said movable member assumes a position requiring a large enough supply of fuel for proper ignition whereupon said motor means is energized in such manner as to quickly move said valve to the required position and for thereafter controlling said motor means in accordance with the movements of said movable member to move said valve in a plurality of relatively small increments as the demand for fuel flow slowly changes.

6. In combination, a single valve for controlling the flow of fuel to a burner, a member movable in response to changes in fuel demand, electric motor means associated with said movable member and valve for controlling the movement of the latter as the result of movements of the former, and means associated with said movable member, valve and motor means for initially opening said valve to a relatively large open position whereby to insure proper ignition and automatically returning the same to a position corresponding to the fuel flow demand upon initial movement of said movable member and for thereafter opening said valve in small increments upon continued movement of said movable member as the demand for fuel increases.

7. In combination, a valve for controlling the flow of fuel to a burner, electric motor means in control of said valve, a member movable back and forth along a predetermined path of travel in response to changes in the demand for fuel, means associated with said movable member for controlling said motor means initially to open the valve sufficiently widely to supply a large enough fuel flow for proper ignition and thereafter automatically to reduce the supply of fuel in conformity with the demand upon movement of said movable member to a position requiring a relatively small fuel flow and for subsequently operating said motor means to open said valve further in a plurality of small increments as the demand for fuel increases.

8. In combination, a valve for controlling the flow of fuel to a burner, a movable member movable along a predetermined path of travel in response to changes in the demand for fuel, electric motor means associated with said valve for moving the same in accordance with the movements of the movable member during predetermined movements thereof, and means associated with said valve and movable member for moving said valve to a relatively large open position and automatically returning the same to a position corresponding to the position of the movable member upon movement of the movable member to a first point in valve opening direction and for closing said valve when said movable member reaches a second point during movement toward valve closing position, said second point not being beyond said first point in valve opening direction of movement of said movable member.

9. In combination, a fluid flow controlling element biased to one of its flow controlling positions, a rotary electrical motor including a pair of energizing windings, means for energizing both of said windings to move said element to a new position against its bias and for deenergizing one of said windings when said element has been moved to its desired position, the other of said windings remaining energized to maintain said element in the position to which it has been moved against its bias.

10. In a modulating control, in combination, an instrumentality movable through a given range and biased for movement to one of the limits of said range, a movable member movable throughout a predetermined range, an actuator for said instrumentality for moving the same to varying positions against its bias and maintaining it therein comprising a single rotary electric motor rotatable in only one direction, and means for completely energizing said motor whenever said movable member moves to a new position during movement in one direction whereby the element moves to a corresponding position and for then partially deenergizing said motor whereby the element is maintained in its new position and for operatively deenergizing said motor upon movement of the movable member in the opposite direction and for energizing a portion thereof when the element has been moved by its bias to a position corresponding to the position of the movable member.

11. In combination, an instrumentality to be controlled movable throughout a given range and biased to move to one of the limits of said range, a control member movable through a predetermined range of movement, a single rotary electric motor rotatable in only one direction, first and second switches, a circuit for partially energizing said motor to hold said instrumentality against its bias in any position to which it is moved and controlled by the first switch, a circuit for completing the energization of said motor when the second switch is closed whereby the instrumentality may be moved to a new position against its bias, means associated with said movable member for closing both of said switches, and means controlled by movement of said instrumentality for opening said second switch when the instrumentality has been moved to the desired position.

12. In combination, an instrumentality to be controlled movable throughout a given range and biased to move to one of the limits of said range, a control member movable through a predetermined range of movement, a single rotary electric motor rotatable in only one direction, first and second switches, a circuit for partially energizing said motor to hold said instrumentality against its bias in any position to which it is moved and controlled by the first switch, a circuit for completing the energization of said motor when the second switch is closed whereby the instrumentality may be moved to a new position against its bias, and means conjointly controlled by said movable member and said instrumentality for closing said second switch when the instrumentality is in a position corresponding to the position of said movable member, for closing both of said switches when the position of said movable member requires further movement of the instrumentality against its bias and for opening both of said switches when the position of said movable member requires movement of said instrumentality by its bias.

13. In combination, a member to be controlled and biased to a predetermined position, a rotary electrical motor rotatable in only one direction for moving said member against its bias and including a plurality of windings, switching means selectively operable to energize two of said windings to produce a magnetic flux sufficient to move said member against its bias, to energize one of said windings to produce a magnetic flux sufficient to maintain said member in a position other than its biased position or to control said windings to produce a magnetic flux sufficiently small to allow said member to move towards its biased position, and means for controlling said switching means.

14. In combination, a member to be controlled and biased to a predetermined position, a rotary electrical motor rotatable in only one direction for moving said member against its bias and including a plurality of windings, switching means selectively operable to energize said windings to produce a magnetic flux sufficient to move said member against its bias, to energize only one of said windings to produce a magnetic flux only sufficient to maintain said member in a position other than its biased position or to control said windings to allow said member to move towards its biased position, a member movable throughout a predetermined range of movement, and means conjointly controlled by the movements of said first-named member and said movable member for controlling said switching means.

15. In combination, a valve biased to closed position in control of the supply of fuel to a burner, a single electric motor rotatable in a single direction for moving said valve toward open position against its bias, means connecting said motor and valve, switching means selectively operable to completely energize said motor to move the valve towards open position against its bias, to partially energize said motor to hold the valve in any of its open positions against the bias of the valve or to operatively deenergize the motor to allow the valve to move towards its closed position under its bias, a member movable in response to changes in the demand for fuel, means conjointly controlled by said movable member and connecting means for controlling said switching means whereby the motor is normally selectively energized to position the valve in accordance with the position of said movable member, and means associated with said last-named means for operating said switching means to maintain the motor deenergized when the valve is closed until the movable member reaches a position such that the valve will initially open sufficiently to supply enough fuel for proper ignition.

16. In combination, a valve biased to closed position, in control of the supply of fuel to a burner, a single electric motor rotatable in a single direction for moving said valve towards open position against its bias, means connecting said motor and valve, switching means selectively operable to completely energize said motor to move the valve towards open position against its bias, to partially energize said motor to hold the valve in any of its open positions against the bias of the valve or to operatively deenergize the motor to allow the valve to move towards its closed position under its bias, a member movable in response to changes in the demand for fuel, means conjointly controlled by said movable member and connecting means for controlling said switching means whereby the motor is normally selectively energized to position the valve in accordance with the position of said movable member, and means associated with said last-named means for operating said switching means to maintain the motor completely energized upon complete energization thereof when the valve is in closed position until the valve is opened to a position supplying a sufficient flow of fuel for proper ignition and then returning the switching means to the conjoint control of the movable member and connecting means.

17. In a heating system, in combination, a single valve in control of the supply of fuel to a burner, a movable member responsive to the temperature of the space to be heated, and control means associated with said valve and movable member for initially opening said valve relatively widely to insure proper ignition at the burner upon a first fall in temperature, automatically returning the valve to a position corresponding to the temperature of the space, and thereafter moving the valve toward wide open position in a plurality of steps as the space temperature continues to fall.

18. In combination, a device to be controlled, a member movable back and forth along a predetermined path of travel, electric motor means associated with said movable member and device for controlling the movement of the latter as the result of movement of the former, and means associated with the movable member, device, and motor means for initially moving said device upon initial movement of the movable member in one direction an amount which is larger than the movement which would correspond to such initial movement of the movable member and automatically returning the same to the position corresponding to the position of the movable member, and for thereafter moving the device in the same direction in small increments as the movable member continues to move in said first direction.

19. In combination, a device to be controlled which is biased to move to an extreme position, a single rotary electrical motor associated with said device for moving the same to a position other than its biased position and including a plurality of windings, a controller for energizing the windings sufficiently to cause the motor to move the device to a new position against its bias, and switching means controlled by movement of said device for energizing only part of said windings of the motor to cause the same to maintain the device in the position to which it had been moved when the energization of the motor windings was changed.

20. In combination, a device to be controlled biased to an extreme position, a rotary electrical motor including a pair of energizing windings, a controller for energizing both of said windings to move the device to a new position against its bias, and switching means for operatively deenergizing one of said windings when the device has been moved to its desired position, the other of said windings remaining energized to maintain the device in the position to which it was formerly moved by the energization of both of said windings.

21. In combination, a device to be controlled which is biased to move to an extreme position, a single rotary electrical motor associated with said device for moving the same to a position other than its biased position and including a plurality of windings, a controller for energizing the motor windings in a manner to cause the motor to move the device to a new position against its bias, and switching means controlled by movement of said device for energizing only one of said windings to render the motor incapable of further moving the device against its bias, said changed energization of the motor windings being sufficient to maintain the device in its new position.

22. In combination, a device to be controlled and biased to an extreme position, a single rotary electrical motor for moving said device to a new position against its bias, connections between said motor and device including a lost-motion connection, a controller, circuit connections controlled by said controller operative partially to energize the motor whereupon the motor takes up said lost-motion connection, switching means operated by the motor while taking up the lost-motion connection for completely energizing the motor whereby the same is energized sufficiently to move the device against its bias after all the lost-motion is taken up, and switching means operated when the device has been moved to a desired position to reduce the motor energization to maintain the device in such new position.

23. In combination, a device to be controlled and biased to an extreme position, a single rotary electrical motor for moving said device to a new position against its bias and including a pair of energizing windings, connections between said motor and device including a lost-motion connection, a controller, circuit connections controlled by said controller operative to energize one of the motor windings whereupon the motor takes up said lost-motion connection, switching means operated by the motor while taking up the lost-motion connection for energizing the other of the motor windings whereby the same is energized sufficiently to move the device against its bias after all the lost-motion is taken up, and switching means operated when the device has been moved to a desired position to deenergize one of the motor windings to maintain the device in such new position.

24. In combination, an instrumentality to be controlled movable throughout a given range and biased to one of the limits of said range, a single rotary electrical motor rotatable in only one direction and arranged to move said instrumentality against its bias, three-position switching mechanism, circuit connections by which the switching mechanism completely energizes the motor to move said instrumentality against its bias when the switching mechanism is in its first position, partially energizes the motor to maintain the instrumentality in any of its positions against its bias when the switching mechanism is in its second position, and operatively deenergizes the motor when the switching mechanism is in its third position whereby the instrumentality is free to move under its bias, a controller, and connections between said controller and motor for conjointly controlling said switching mechanism.

25. In combination, an instrumentality to be controlled movable throughout a given range and biased to one of the limits of said range, a single rotary electrical motor rotatable in only one direction and arranged to move said instrumentality against its bias, three-position switching mechanism, circuit connections by which the switching mechanism completely energizes the motor to move said instrumentality against its bias when the switching mechanism is in its first position, partially energizes the motor to maintain the instrumentality in any of its positions against its bias when the switching mechanism is in its second position, and operatively deenergizes the motor when the switching mechanism is in its third position whereby the instrumentality is free to move under its bias, electrical means in control of said switching mechanism, a controller, and connections between said electrical means, controller, and motor by which the energization of the motor is conjointly controlled by the controller and motor.

26. In combination, an instrumentality to be controlled movable throughout a given range and baised to one of the limits of said range, a single rotary electrical motor rotatable in only one direction and arranged to move said instrumentality against its bias, three-position switching means, circuit connections by which the switching mechanism completely energizes the motor to move said instrumentality against its bias when the switching mechanism is in its first position, partially energizes the motor to maintain the instrumentality in any of its positions against its bias when the switching mechanism is in its second position, and operatively deenergizes the motor when the switching mechanism is in its third position whereby the instrumentality is free to move under its bias, electrical means in control of said switching mechanism, a current varying controller, a current varying device operated by the motor, and connections between the current varying controller, current varying device, and electrical means.

27. In combination, an instrumentality to be controlled movable throughout a given range and biased to one of the limits of said range, a single rotary electrical motor rotatable in only one direction and arranged to move said instrumentality against its bias, three-position switching means, circuit connections by which the switching mechanism completely energizes the motor to move said instrumentality against its bias when the switching mechanism is in its first position, partially energizes the motor to maintain the instrumentality in any of its positions against its bias when the switching mechanism is in its second position, and operatively deenergizes the motor when the switching mechanism is in its third position whereby the instrumentality is free to move under its bias, a pair of oppositely acting electrical devices in control of the switching mechanism and arranged to cause the switching mechanism to assume its second position when both devices are equally energized and to assume its first and third positions when one or the other of said devices is energized to a higher degree, a variable resistance controller connected to said devices for varying the energizations thereof, and a variable resistance balancing means operated in accordance with the movements of said instrumentality connected to said devices for rebalancing the energizations thereof.

28. In combination, an instrumentality to be controlled movable throughout a given range and biased to one of the limits of said range, a single rotary electrical motor rotatable in only one direction and arranged to move said instrumentality against its bias, three-position switching means, circuit connections by which the switching mechanism completely energizes the motor to move said instrumentality against its bias when the switching mechanism is in its first position, partially energizes the motor to maintain the instrumentality in any of its positions against its bias when the switching mechanism is in its second position, and operatively deenergizes the motor when the switching mechanism is in its third position whereby the instrumentality is free to move under its bias, a pair of oppositely acting electrical devices in control of the switching mechanism and arranged to cause the switching mechanism to assume its second position when both devices are equally energized and to assume its first and third positions when one or the other of said devices is energized to a higher degree, a variable resistance controller connected to said devices for varying the energizations thereof, a variable resistance balancing means operated in accordance with the movements of said instrumentality connected to said devices for rebalancing the energizations thereof, and means for short circuiting a portion of the variable resistance balancing means to prevent operation of the switching mechanism to its first position until the controller resistance is varied a predetermined amount from one of its extremes whereby to prevent an initial movement of the instrumentality until the controller requires a substantial movement thereof.

29. In combination, an instrumentality to be controlled movable throughout a given range and biased to one of the limits of said range, a single rotary electrical motor rotatable in only one direction and arranged to move said instrumentality against its bias, three-position switching means, circuit connections by which the switching mechanism completely energizes the motor to move said instrumentality against its bias when the switching mechanism is in its first position, partially energizes the motor to maintain the instrumentality in any of its positions against its bias when the switching mechanism is in its second position, and operatively deenergizes the motor when the switching mechanism is in its third position whereby the instrumentality is free to move under its bias, a pair of oppositely acting electrical devices in control of the switching mechanism and arranged to cause the switching mechanism to assume its second position when both devices are equally energized and to assume its first and third positions when one or the other of said devices is energized to a higher degree, a variable resistance controller connected to said devices for varying the energizations thereof, a variable resistance balancing means operated in accordance with the movements of said instrumentality connected to said devices for rebalancing the energizations thereof, and means for preventing variation of the variable resistance balancing means only during initial movement of the instrumentality from its extreme biased position.

LEWIS L. CUNNINGHAM.